(12) United States Patent
Wei (10) Patent No.: US 11,914,276 B2
(45) Date of Patent: Feb. 27, 2024

(54) OPTICAL ENGINE MODULE AND PROJECTION DEVICE

(71) Applicant: Coretronic Corporation, Hsin-Chu (TW)

(72) Inventor: Chung-Ting Wei, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/723,420

(22) Filed: Apr. 18, 2022

(65) Prior Publication Data
US 2022/0342288 A1 Oct. 27, 2022

(30) Foreign Application Priority Data
Apr. 27, 2021 (CN) .......................... 202120879117.7

(51) Int. Cl.
*G03B 21/14* (2006.01)
*G03B 21/00* (2006.01)
*G03B 21/20* (2006.01)

(52) U.S. Cl.
CPC ......... *G03B 21/147* (2013.01); *G03B 21/005* (2013.01); *G03B 21/2066* (2013.01)

(58) Field of Classification Search
CPC ............... G03B 21/147; G03B 21/005; G03B 21/2066; G03B 21/28; G02B 5/003; G02B 27/0018; G02B 5/04
See application file for complete search history.

(56) References Cited

U.S. PATENT DOCUMENTS

| 9,033,521 B2 | 5/2015 | Chen et al. | |
| 2002/0015136 A1* | 2/2002 | Sawamura | G03B 21/005 |
| | | | 353/33 |
| 2003/0123162 A1* | 7/2003 | Penn | G02B 5/04 |
| | | | 359/833 |
| 2007/0195417 A1* | 8/2007 | Yamamoto | H04N 9/3114 |
| | | | 359/590 |
| 2008/0259287 A1* | 10/2008 | Liao | G03B 33/12 |
| | | | 353/38 |
| 2009/0067072 A1* | 3/2009 | Kao | G03B 21/008 |
| | | | 359/834 |

(Continued)

FOREIGN PATENT DOCUMENTS

| CN | 1588227 | 3/2005 |
| CN | 206115130 | 4/2017 |

(Continued)

*Primary Examiner* — Magda Cruz
(74) *Attorney, Agent, or Firm* — JCIPRNET (57) ABSTRACT

An optical engine module and a projection device are provided. The optical engine module includes a first prism, a light valve, a second prism, and a light-shielding element. The first prism is disposed on a transmission path of an illumination light beam. The light valve is disposed on the transmission path of the illumination light beam from the first prism. The light valve has a reflection surface suitable for converting the illumination light beam into an image beam. The second prism is located between the first prism and the light valve, and is disposed on the transmission path of the illumination light beam from the first prism and on a transmission path of the image beam from the light valve. The light-shielding element is located between the first prism and the second prism.

10 Claims, 4 Drawing Sheets

(56) References Cited

U.S. PATENT DOCUMENTS

2012/0300180 A1* 11/2012 Jeon ..................... G02B 27/149
                                                        353/81
2014/0368797 A1   12/2014 Ferri et al.
2016/0241819 A1*  8/2016 Chien ................ G02B 27/0018
2021/0216003 A1*  7/2021 Wei .......................... G02B 5/04

FOREIGN PATENT DOCUMENTS

| CN | 210867986 | 6/2020 |
| TW | 550396    | 9/2003 |
| TW | 200707060 | 2/2007 |

\* cited by examiner

OPTICAL ENGINE MODULE AND PROJECTION DEVICE

CROSS-REFERENCE TO RELATED APPLICATION

This application claims the priority benefit of China application serial no. 202120879117.7, filed on Apr. 27, 2021. The entirety of the above-mentioned patent application is hereby incorporated by reference herein and made a part of this specification.

BACKGROUND

1. Technical Field

The disclosure is related to an optical module and an optical device, and more particularly related to an optical engine module and a projection device.

2. Description of Related Art

In response to projection applications of electronic devices such as mobile devices or wearable devices, there is a demand for lightweight and small-sized projection devices. However, as the size of the projection device becomes smaller, the stray light formed by reflection in the projection device is more likely to enter the projection lens through the reflection of the light valve, causing ghost images on the display screen. The ghost image is an image that does not exist in the original image data, so the generation of ghost images affects the display quality.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides an optical engine module and a projection device, which have good display quality.

Other purposes and advantages of the disclosure may be further understood from the technical features disclosed in the disclosure.

In order to achieve one, a portion, or all of the above-mentioned aspects or other purposes, an embodiment of the disclosure provides an optical engine module. The optical engine module includes a first prism, a light valve, a second prism, and a light-shielding element. The first prism is disposed on a transmission path of an illumination light beam. The light valve is disposed on the transmission path of the illumination light beam from the first prism. The light valve has a reflection surface suitable for converting the illumination light beam into the image beam. The second prism is located between the first prism and the light valve, and is disposed on the transmission path of the illumination light beam from the first prism and on a transmission path of the image beam from the light valve. The light-shielding element is located between the first prism and the second prism.

In order to achieve one, a portion, or all of the above-mentioned aspects or other purposes, an embodiment of the disclosure provides a projection device. The projection device includes an illumination system, an optical engine module, and a projection lens. The illumination system is suitable for providing an illumination light beam. The optical engine module includes a first prism, a light valve, a second prism, and a light-shielding element. The first prism is disposed on a transmission path of an illumination light beam. The light valve is disposed on the transmission path of the illumination light beam from the first prism, where the light valve has a reflection surface suitable for converting the illumination light beam into the image beam. The second prism is located between the first prism and the light valve, and is disposed on the transmission path of the illumination light beam from the first prism and on a transmission path of the image beam from the light valve. The light-shielding element is located between the first prism and the second prism. The projection lens is disposed on the transmission path of the image beam.

Base on the above, the embodiments of the disclosure have at least one of the following advantages or effects. In the optical engine module and the projection device of the disclosure, by blocking stray light with the light-shielding element located between the first prism and the second prism, the ghost image caused by the stray light can be reduced. Therefore, the optical engine module and the projection device of the disclosure can have good display quality.

Other objectives, features and advantages of the disclosure will be further understood from the further technological features disclosed by the embodiments of the disclosure wherein there are shown and described exemplary embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of the specification. The drawings illustrate embodiments of the disclosure and, together with the description, serve to explain the principles of the disclosure.

DESCRIPTION OF THE EXEMPLARY EMBODIMENTS

In the following detailed description of the exemplary embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
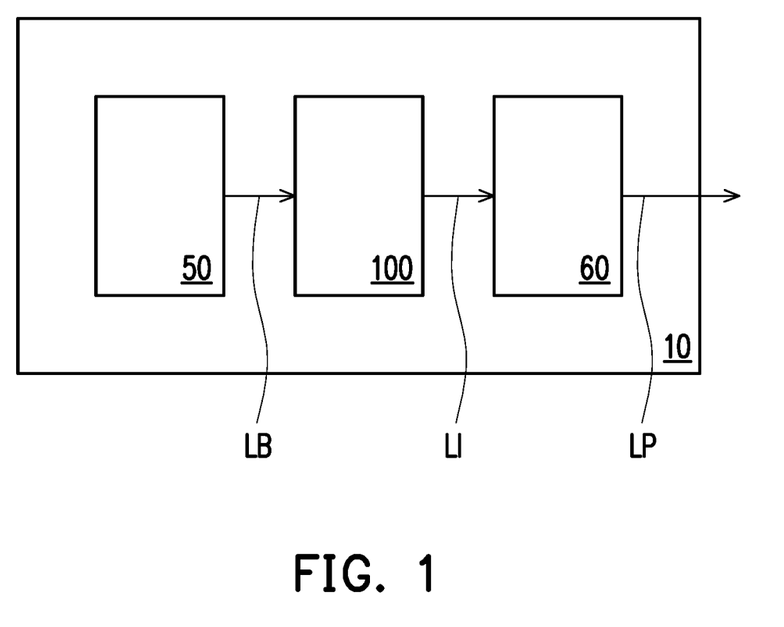
FIG. 1 is a schematic diagram of a projection device of an embodiment of the disclosure.

FIG. 1 is a schematic diagram of a projection device of an embodiment of the disclosure. Referring to FIG. 1, a projection device 10 may include an illumination system 50, an optical engine module 100, and a projection lens 60. The illumination system 50 is suitable for providing an illumination light beam LB. The optical engine module 100 is disposed on a transmission path of the illumination light beam LB, and is suitable for converting the illumination light beam LB into an image beam LI. The projection lens 60 is disposed on a transmission path of the image beam LI, and is suitable for converting the image beam LI into a projection beam LP. The projection beam LP is projected to a projection target (not shown, such as a screen or a wall) through the projection lens 60.

In some embodiments, the illumination system 50 may provide light of different wavelengths in different time periods. For example, the illumination system 50 may sequentially provide red light, green light, and blue light, but the disclosure is not limited thereto. In some embodiments, although not shown, the illumination system 50 may include multiple light-emitting elements, a wavelength conversion element, a light-homogenizing element, a light-filtering element, a light-splitting element, a light-combining element, and/or reflectors. However, the disclosure does not limit the type or form of the illumination system 50 in the projection device 10, and the detailed structure and implementation method of which can be fully taught, suggested, and illustrated by the common knowledge in the art and will therefore not be repeated.

The projection lens 60 may include one or multiple optical lenses having refractive power. The optical lenses may include non-planar lenses such as double-concave lenses, double-convex lenses, concave-convex lenses, convex-concave lenses, plano-convex lenses, and plano-concave lenses. In some embodiments, the projection lens 60 may further include a planar optical lens so as to project the image beam LI from the optical engine module 100 to the projection target by reflection. The disclosure does not impose limits on the type and form of the projection lens 60.

Figure 2:
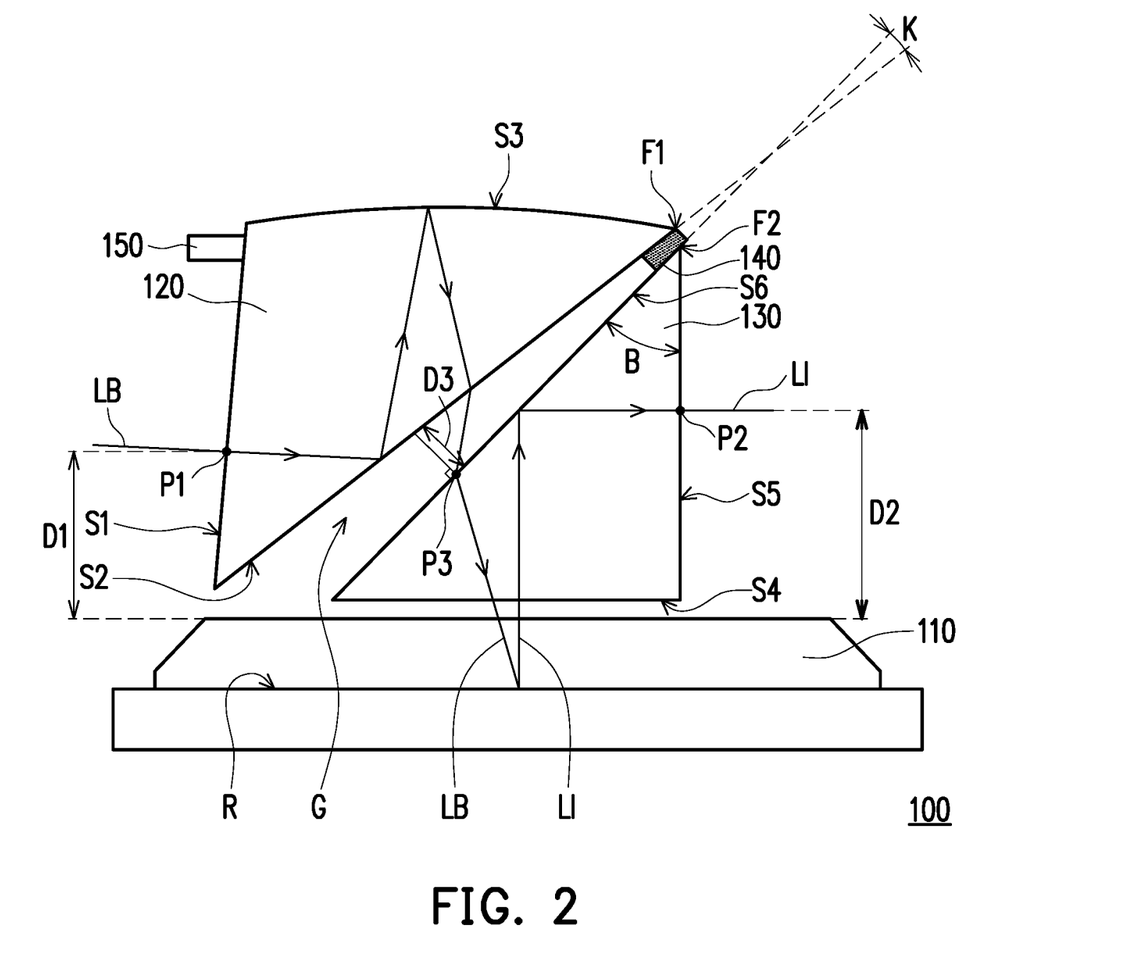
FIG. 2 is a schematic diagram of a side view of an optical engine module of an embodiment of the disclosure.

FIG. 2 is a schematic diagram of a side view of an optical engine module of an embodiment of the disclosure. Referring to FIG. 1 and FIG. 2, the optical engine module 100 may include a light valve 110, a first prism 120, a second prism 130, and a light-shielding element 140, but the disclosure is not limited thereto. The optical engine module 100 may increase or decrease one or multiple elements or layers according to requirements.

The light valve 110 may include reflective type light modulators such as a liquid crystal on silicon panel (LCoS panel) or a digital micro-mirror element (DMD), but the disclosure is not limited thereto. The light valve 110 has a reflection surface R. The reflection surface R is suitable for converting the illumination light beam LB into the image beam LI. In other words, the surface of the light valve 110 that converts the illumination light beam LB into the image beam LI and reflects the image beam LI is the reflection surface R. The detailed steps and implementation method for converting the illumination light beam LB into the image beam LI by the reflection surface R can be fully taught, suggested, and illustrated by the common knowledge in the art and will therefore not be repeated. In some embodiments, as shown in FIG. 2, the number of the light valve 110 may be one. However, in other embodiments, the number of the light valve 110 may be multiple. The disclosure does not limit the number of light valves 110.

The first prism 120 is disposed on the transmission path of the illumination light beam LB. The light valve 110 is disposed on the transmission path of the illumination light beam LB from the first prism 120. The second prism 130 is located between the first prism 120 and the light valve 110, and is disposed on the transmission path of the illumination light beam LB from the first prism 120 and on a transmission path of the image beam LI from the light valve 110. The illumination light beam LB is transmitted to the light valve 110 sequentially via the first prism 120 and the second prism 130. The light valve 110 converts the illumination light beam LB into the image beam LI and reflects the image beam LI, and the reflected image beam LI exits the optical engine module 100 via the second prism 130.

In detail, the first prism 120 has a first surface S1, a second surface S2, and a third surface S3. The second surface S2 faces the second prism 130 and is located between the third surface S3 and the light valve 110. The second prism 130 has a fourth surface S4, a fifth surface S5, and a sixth surface S6. The sixth surface S6 faces the first prism 120, and the fourth surface S4 is located between the sixth surface S6 and the light valve 110.

In some embodiments, the refractive power of the third surface S3 of the first prism 120 is positive. In some embodiments, the third surface S3 is a spherical surface, an aspheric surface, or a surface with diffraction function, but the disclosure is not limited thereto. In some embodiments, the second surface S2 of the first prism 120 and the sixth surface S6 of the second prism 130 are not parallel to each other. For example, an angle K between the second surface S2 of the first prism 120 and the sixth surface S6 of the second prism 130 may be larger than 4 degrees, but the disclosure is not limited thereto. In some embodiments, the second prism 130 may be a 45-degree total internal reflection prism, wherein the fourth surface S4 of the second prism 130 may be parallel to the reflection surface R of the light valve 110, wherein a 45-degree angle is included between the sixth surface S6 and the fourth surface S4, and a 45-degree angle is included between the sixth surface S6 and the fifth surface S5, but the disclosure is not limited thereto.

In terms of light path, the illumination light beam LB enters the first prism 120 from the first surface S1, is sequentially reflected by the second surface S2 and the third surface S3, and exits the first prism 120 from the second surface S2. The illumination light beam LB from the first prism 120 enters the second prism 130 from the sixth surface S6, then exits the second prism 130 from the fourth surface S4 and is transmitted to the reflection surface R of the light valve 110 to form the image beam LI. The image beam LI enters the second prism 130 from the fourth surface S4, is reflected by the sixth surface S6, and exits the second prism 130 from the fifth surface S5.

The direction in which the illumination light beam LB enters the first prism 120 is substantially the same as the direction in which the image beam LI exits the second prism 130. In some embodiments, a shortest distance D1 between an intersection point P1 at which a center light of the illumination light beam LB (such as the path of the illumination light beam LB shown in FIG. 2) enters the first surface S1 and the light valve 110 is smaller than a shortest distance D2 between an intersection point P2 at which a center light of the image beam LI (such as the path of the image beam LI shown in FIG. 2) exits the fifth surface S5 and the light valve 110. Furthermore, the first prism 120 does not overlap the light valve 110 in an extending direction parallel to the reflection surface R of the light valve 110. Therefore, the accommodation space of the light valve 110 will not be limited by the geometric structure of the first prism 120.

In some embodiments, the illumination light beam LB does not pass through any optical element or any fixed colloid on the transmission path between the first prism 120 and the second prism 130. In other words, there is no optical element or any fixed colloid (such as transparent spacer or adhesive transparent colloid) between the first prism 120 and the second prism 130. That is to say, when assembling the optical engine module 100, the first prism 120 and the second prism 130 can be assembled into one component without the need to set up transparent spacers or glue fixation in advance. In this way, the assembly of the first prism 120 and the second prism 130 can be simplified, while maintaining good optical effect in a lightweight and small-sized architecture. In some embodiments, a shortest distance D3 between an intersection point P3 at which the center light of the illumination light beam LB enters the sixth surface S6 of the second prism 130 and the first prism 120 may be larger than 0.5 mm. In other words, a spacing G between the first prism 120 and the second prism 130 is larger than the spacing between two conventional prisms and has a different order.

In some embodiments, the optical engine module 100 may further include an assembly portion 150. In some embodiments, the assembly portion 150 may be integrally formed with one of the first prism 120 and the second prism 130, and the one of the first prism 120 and the second prism 130 which includes the assembly portion 150 may be connected, through the assembly portion 150, to the housing of the projection device 10 for carrying the optical engine module 100. For example, the first prism 120 may have an assembly portion 150 integrally formed therewith, wherein the material of the first prism 120 may be plastic, and the material of the second prism 130 may be glass. In this way, the first prism 120 may be connected to the housing of the projection device 10 by the assembly portion 150, such that the spacing G is formed between the first prism 120 and the second prism 130, without the need of other spacers. In some embodiments, the second prism 130 may be disposed in a pre-planned accommodation space in the housing without the need of assembly portion 150. In other embodiments not shown, the first prism 120 may be disposed in a pre-planned accommodation space in the housing without the need of assembly portion 150, and the second prism 130 may have another assembly portion 150 integrally formed to be connected to the housing, but the disclosure is not limited to thereto. Alternatively, the first prism 120 and the second prism 130 may each be disposed in a pre-planned accommodation space in the housing without the need of assembly portion 150, or the first prism 120 and the second prism 130 may each have an integrally formed assembly portion 150.

The light-shielding element 140 is located between the first prism 120 and the second prism 130, and the light-shielding element 140 may be a light-absorbing element suitable for absorbing light beams of all wavelength bands or a light-absorbing element suitable for absorbing light beams of blue wavelength band and allowing light beams of red wavelength band and green wavelength band to pass through. By blocking stray light with the light-shielding element 140 located between the first prism 120 and the second prism 130, the ghost image caused by the stray light can be effectively reduced. Therefore, the optical engine module 100 and the projection device 10 (see FIG. 1) can have good display quality.

In detail, as shown in FIG. 2, the light-shielding element 140 may be located between the second surface S2 and the sixth surface S6, and is located outside a transmission path of the center light of the illumination light beam LB. That is, the light-shielding element 140 is not located on the transmission path of the center light of the illumination light beam LB, so as to reduce the shielding of the light-shielding element 140 to the center light of the illumination light beam LB. In some embodiments, the light-shielding element 140 may be disposed close to the third surface S3 and away from the first surface S1. Moreover, the light-shielding element 140 may be disposed close to the fifth surface S5 and far away from the fourth surface S4. In some embodiments, as shown in FIG. 2, the light-shielding element 140 may be a blocking plate disposed between the second surface S2 and the sixth surface S6. In other embodiments, as shown in FIGS. 3 and 4, the light-shielding element 140 may be a light-absorbing layer formed on at least one of the second surface S2 and the sixth surface S6 by printing, applying, or coating, and the light-shielding element 140 is disposed adjacent to a junction F1 between the second surface S2 and the third surface S3 or a junction F2 between the sixth surface S6 and the fifth surface S5.

Figure 3:
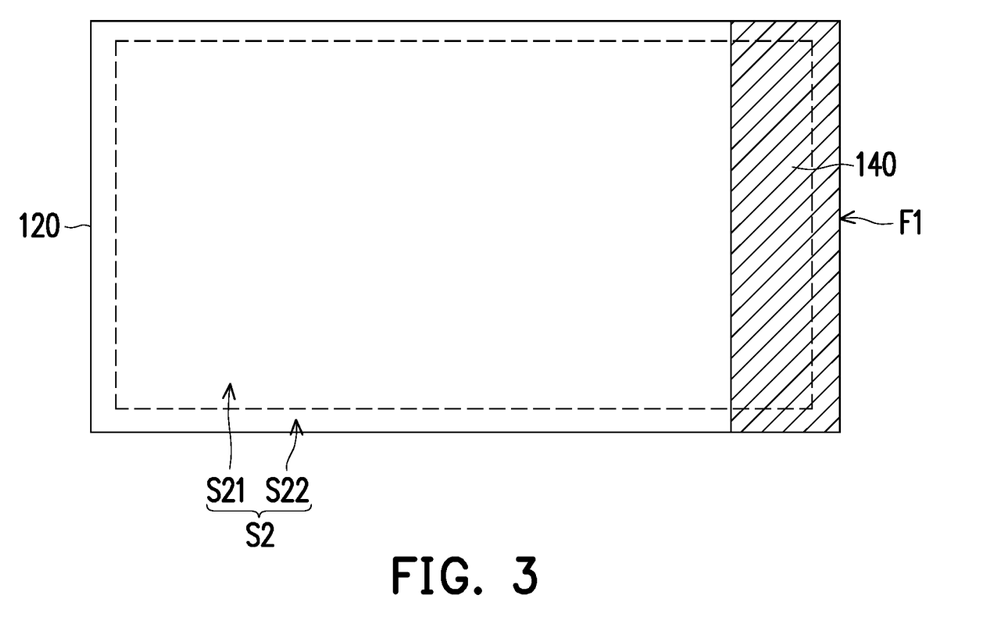
FIG. 3 is a schematic diagram of a top view of the second surface of the first prism in FIG. 2.

FIG. 3 is a schematic diagram of a top view of the second surface of the first prism in FIG. 2. FIG. 4 is a schematic diagram of a top view of the sixth surface of the second prism in FIG. 2. In some embodiments, as shown in FIG. 3, the light-shielding element 140 may be a light-absorbing layer formed on the second surface S2, and the light-shielding element 140 is disposed adjacent to the junction F1 between the second surface S2 and the third surface S3 (see FIG. 2). For example, the light-shielding element 140 may be disposed on a side of the second surface S2 close to the junction F1 along an extending direction of the junction F1. In some embodiments, the light-shielding element 140 covers a portion of an optical effective area S21 of the second surface S2 and a portion of a peripheral area S22 surrounding the optical effective area S21 (FIG. 3 shows the junction between the optical effective area S21 and the peripheral area S22 with a dotted line). Therefore, based on considerations such as brightness and display quality (improvement of ghost image), an area of the light-shielding element 140 is, for example, 8% to 17% of an area of the second surface S2.

Figure 4:
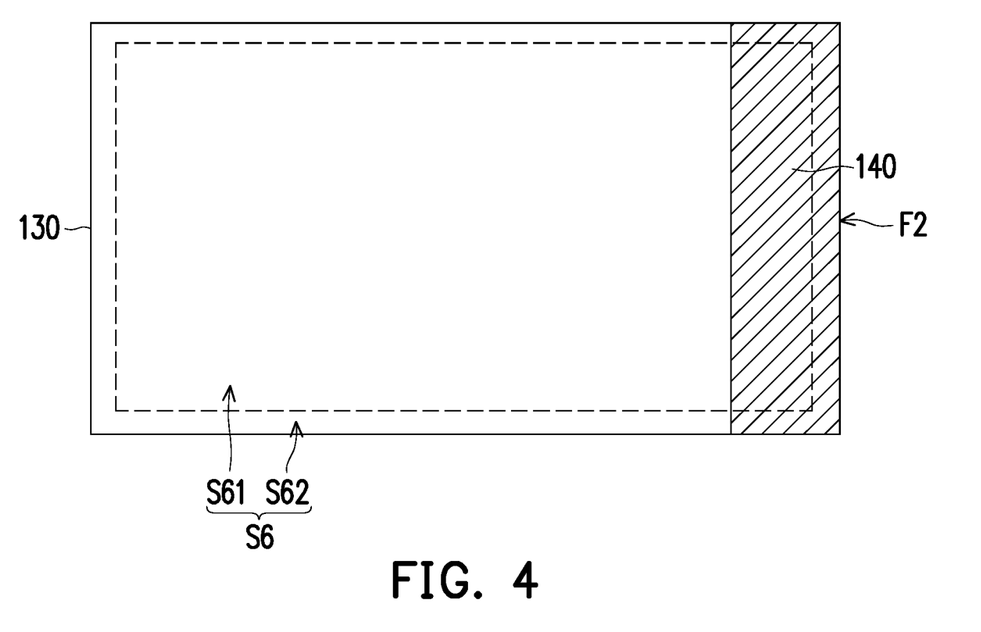
FIG. 4 is a schematic diagram of a top view of the sixth surface of the second prism in FIG. 2.

In other embodiments, as shown in FIG. 4, the light-shielding element 140 may be a light-absorbing layer formed on the sixth surface S6, and the light-shielding element 140 is disposed adjacent to the junction F2 between the sixth surface S6 and the fifth surface S5 (see FIG. 2). For example, the light-shielding element 140 may be disposed on a side of the sixth surface S6 close to the junction F2 along an extending direction of the junction F2. In some embodiments, the light-shielding element 140 covers a portion of an optical effective area S61 of the sixth surface S6 and a portion of a peripheral area S62 surrounding the optical effective area S61 (FIG. 4 shows the junction between the optical effective area S61 and the peripheral area S62 with a dotted line). Therefore, based on considerations such as brightness and display quality (improvement of ghost image), an area of the light-shielding element 140 is, for example, 9% to 20% of an area of the sixth surface S6.

In other embodiments, the light-shielding element 140 may be formed on both of the second surface S2 and the sixth surface S6, which will not be repeated here.

Figure 5:
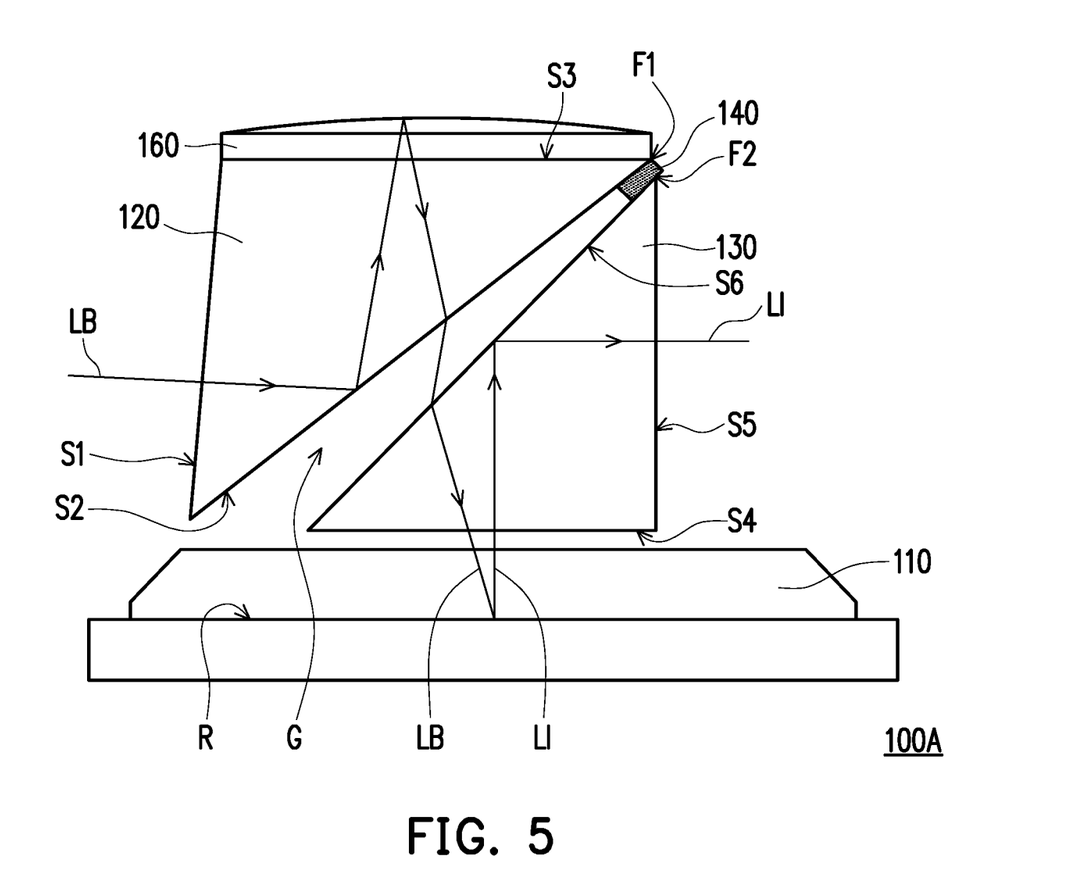
FIG. 5 is a schematic diagram of a side view of an optical engine module of another embodiment of the disclosure.

FIG. 5 is a schematic diagram of a side view of an optical engine module of another embodiment of the disclosure. Referring to FIG. 5, the main differences between an optical engine module 100A and the optical engine module 100 in FIG. 2 are as follows. In the optical engine module 100A, the third surface S3 is a flat surface. Moreover, the optical engine module 100A further includes a curved-surface reflection element 160. The curved-surface reflection element 160 is disposed on the third surface S3 of the first prism 120, and is suitable for reflecting the illumination light beam LB, such that the illumination light beam LB exits the first prism 120 from the second surface S2. With such design, the manufacturing of the first prism 120 can be simplified, and the material of first prism 120 can be further selected from glass so as to improve the overall optical effect.

In summary, the embodiments of the disclosure have at least one of the following advantages or effects. In the optical engine module and projection device of the disclosure, by blocking stray light with the light-shielding element between the first prism and the second prism, the ghost image caused by the stray light can be reduced. Therefore, the optical engine module and the projection device of the disclosure can have good display quality. In some embodiments, the optical engine module includes a light valve, a first prism, a second prism, and a light-shielding element, and the transmission path between first prism and second prism may not need to be disposed with an optical element or fixing colloid. Therefore, when assembling the optical engine module, the first prism and the second prism can be assembled into one component without the need to set up transparent spacers or glue fixation in advance, and without the need of other spacers to form the spacing. In this way, the assembly of the prism set can be simplified, while maintaining good optical effect in a lightweight and small-sized architecture. In some embodiments, the manufacturing of the first prism can be simplified by the design that the third surface is a flat surface and the curved-surface reflection element is disposed on the third surface, and the material of the first prism can be further selected from glass so as to improve the overall optical effect.

The foregoing description of the exemplary embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the disclosure" or the like does not necessarily limit the claim scope to a specific embodiment, and the reference to particularly exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. An optical engine module, comprising:
   a first prism disposed on a transmission path of an illumination light beam;
   a light valve disposed on the transmission path of the illumination light beam from the first prism, wherein the light valve has a reflection surface suitable for converting the illumination light beam into an image beam;
   a second prism located between the first prism and the light valve, and disposed on the transmission path of the illumination light beam from the first prism and on a transmission path of the image beam from the light valve; and
   a light-shielding element located between the first prism and the second prism.

2. The optical engine module according to claim 1, wherein:
   the first prism has a first surface, a second surface, and a third surface, wherein the illumination light beam enters the first prism from the first surface, is sequentially reflected by the second surface and the third surface, and exits the first prism from the second surface;
   the second prism has a fourth surface, a fifth surface, and a sixth surface, wherein the illumination light beam from the first prism enters the second prism from the sixth surface, then exits the second prism from the fourth surface and is transmitted to the reflection surface of the light valve to form the image beam, wherein the image beam enters the second prism from the fourth surface, is reflected by the sixth surface, and exits the second prism from the fifth surface; and the light-shielding element is located between the second surface and the sixth surface, and is located outside a transmission path of a center light of the illumination light beam.

3. The optical engine module according to claim 2, wherein the third surface is a spherical surface, an aspheric surface, or a surface with diffraction function.

4. The optical engine module according to claim 2, wherein the light-shielding element is disposed close to the third surface and away from the first surface.

5. The optical engine module according to claim 2, wherein the light-shielding element is a blocking plate disposed between the second surface and the sixth surface.

6. The optical engine module according to claim 2, wherein the light-shielding element is a light-absorbing layer formed on at least one of the second surface and the sixth surface, and the light-shielding element is disposed adjacent to a junction between the second surface and the third surface or a junction between the sixth surface and the fifth surface.

7. The optical engine module according to claim 6, wherein an area of the light-shielding element is 8% to 17% of an area of the second surface.

8. The optical engine module according to claim 6, wherein an area of the light-shielding element is 9% to 20% of an area of the sixth surface.

9. The optical engine module according to claim 1, wherein the light-shielding element is a light-absorbing element suitable for absorbing light beams of all wavelength bands or a light-absorbing element suitable for absorbing light beams of blue wavelength band and allowing light beams of red wavelength band and green wavelength band to pass through.

10. A projection device, comprising:

an illumination system suitable for providing an illumination light beam;

an optical engine module comprising:

a first prism disposed on a transmission path of the illumination light beam;

a light valve disposed on the transmission path of the illumination light beam from the first prism, wherein the light valve has a reflection surface suitable for converting the illumination light beam into an image beam;

a second prism located between the first prism and the light valve, and disposed on the transmission path of the illumination light beam from the first prism and on a transmission path of the image beam from the light valve; and a light-shielding element located between the first prism and the second prism; and a projection lens disposed on the transmission path of the image beam.

\* \* \* \* \*